United States Patent
Castorena Martinez (10) Patent No.: US 10,739,459 B2
(45) Date of Patent: Aug. 11, 2020

(54) LIDAR LOCALIZATION

(71) Applicant: Ford Global Technologies, LLC, Dearborn, MI (US)

(72) Inventor: Juan Castorena Martinez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 15/870,189

(22) Filed: Jan. 12, 2018

(65) Prior Publication Data

US 2019/0219697 A1    Jul. 18, 2019

(51) Int. Cl.
    *G01S 17/42*     (2006.01)
    *G01S 17/86*     (2020.01)
    *G01S 17/931*    (2020.01)
    *G01C 21/30*     (2006.01)

(52) U.S. Cl.
    CPC .............. *G01S 17/42* (2013.01); *G01C 21/30* (2013.01); *G01S 17/86* (2020.01); *G01S 17/931* (2020.01)

(58) Field of Classification Search
    CPC ...... G01S 17/42; G01S 17/936; G01S 17/013; G01C 21/30
    USPC .......................................................... 701/445
    See application file for complete search history.

(56) References Cited

U.S. PATENT DOCUMENTS

| | | | |
|---|---|---|---|
| 8,825,391 B1 | 9/2014 | Urmson et al. | |
| 9,037,403 B2 | 5/2015 | Delp | |
| 10,176,596 B1 * | 1/2019 | Mou | G01S 7/4972 |
| 2008/0033645 A1 | 2/2008 | Levinson et al. | |
| 2010/0114416 A1 | 5/2010 | Au et al. | |
| 2016/0209846 A1 | 7/2016 | Eustice et al. | |
| 2017/0227647 A1 | 8/2017 | Baik | |
| 2019/0049566 A1 * | 2/2019 | Adams | G01C 25/00 |

FOREIGN PATENT DOCUMENTS

| | | |
|---|---|---|
| CN | 105204510 A | 12/2015 |
| CN | 106441319 A | 2/2017 |
| CN | 106908775 A | 6/2017 |
| JP | 2016142604 A | 8/2016 |

OTHER PUBLICATIONS

J. M. Maroli, Ü. Özgüner, K. Redmill and A. Kurt, "Automated rotational calibration of multiple 3D LIDAR units for intelligent vehicles," 2017 IEEE 20th International Conference on Intelligent Transportation Systems (ITSC), Yokohama, 2017, pp. 1-6. (Year: 2017).*

D Kortenkamp, R.P. Bonasso, and R. Murphy, AI-based mobile robots; Case studies of succesful robot systems, MIT Press, Cambridge, MA, 1998.

(Continued)

*Primary Examiner* — Krishnan Ramesh
(74) *Attorney, Agent, or Firm* — Frank A. MacKenzie; Bejin Bieneman PLC (57) ABSTRACT

A system including a processor and a memory, the memory including instructions to be executed by the processor to determine map data, determine uncalibrated LIDAR data, determine a location of a vehicle in the map data by combining the map data with the uncalibrated LIDAR data, and operate the vehicle based on the location of the vehicle in the map data.

18 Claims, 9 Drawing Sheets

(56) References Cited

OTHER PUBLICATIONS

A. Elfes, "Using occupancy grids for mobile robot perception and navigation," Computer, vol. 22, No. 6, pp. 46-57, 1989.
K. Konolige and K. Chou, "Markov localization using correlation," in in Proceedings of the Sixteenth International Joint Conference on Artificial Intelligence (IJCAI), Stockhold, Sweden, 1999.
J. Levinson and S. Thrun, "Robust vehicle localization in urban environments using probabilistic maps," IEEE International Conference on Robotics and Automation, pp. 4372-4378, May 2010.
R.W. Wolcott and R.M. Eustice, "Visual localization within lidar maps for automated urban driving," in in the IEEE/RSJ International Conference on Intelligent Robots and Systems (IROS), Phoenix, Arizona, USA, Sep. 2014.
S. Thrun, "Learning metric-topological maps for indoor mobile robot navigation," Artificial Intelligence, vol. 99, No. 1, pp. 21-71, 1989.
P. Ondruska and I. Posner, "Deep tracking: Seeing beyond seeing using recurrent neural networks," in in the Thirtieth AAAI Conference on Artificial Intelligence (AAAI), Phoenix, Arizona, USA, Feb. 2016.
H. Guan, J. Li, Y. Yu, C. Wang nad M. Chapman, and B. Yang, "Using mobile laser scanning data for automated extraction of road markings," ISPRS Journal of Photogrammetry and Remote Sensing, No. 87, pp. 93-107, Dec. 2015.
S. Pu, M. Rutzinger, G. Vosselman, and S. O. Elberink, "Recognizing basic structures from mobile laser scanning data for road inventory studies," ISPRS Journal of Photogrammetry and Remote Sensing, vol. 66, No. 6, pp. S28-S39, 2011.
A. Chin and M.J. Olsen, "Evaluation of technologies for road profile capture, analysis, and evaluation," Journal of Surveying Engineering, vol. 141, No. 1, 2014.
J. Levinson, Montemerlo M., and S. Thrun, "Map-based precision vehicle localization in urban environments," in Robotics Science and Systems, 2007.
H. Durrant-Whyte and T. Bailey, "Simultaneous localization and mapping: Part i," IEEE Robotics and Automation Magazine, vol. 13, No. 2, pp. 99-110, 2006.
H. Durrant-Whyte and T. Bailey, "Simultaneous localization and mapping: Part ii," IEEE Robotics and Automation Magazine, vol. 13, No. 3, pp. 108-117, 2006.
A. Kashani, M. Olsen, C.E. Parrish, and N. Wilson, "A review of lidar radiometric processing: From ad hoc intensity correction to rigorous radiometric calibration," Sensors, , No. 15, pp. 28099-28128, Nov. 2015.
B.R. Harvey and D.D. Lichti, "The effects of reflecting surface material properties on time-of-flight laser scanning measurements," International properties on time-of-flight laser scanning measurements., 2005.
W. Burgard, R. Triebel, and H. Andreasson, "Improving plane extraction from 3d data by fusing laser data and vision," Intelligent Robotics and Systems, 2005.
E. Ahokas, S. Kaasalainen, J. Hyypa, and J. Suomalainen, "Calibration of the optech altm 3100 laser scanner intensity data using brightness targets," in Int. Arch. Photogrammetry Remote Sensing Spat. Inf. Sci., 2006, vol. 34, pp. 3-6.
D. Lichti and B. Harvey, "Radiometric calibration of terrestrial laser scanners with external reference targets," Remote Sensing, vol. 1, pp. 144-158, 2009.

N. Pfeifer, P. Dorninger, A. Haring, and H. Fan, "Investigating terrestrial laser scanning intensity data: Quality and functional relations," in Pro-ceedings of the 8th Conference on Optical 3-D Measurement Techniques, Zurich, Switzerland, Jul. 9-12, 2007, pp. 328-337.
N. Pfeifer, B. Hofle, C. Briese, M. Rutzinger, and A. Haling, "Analysis of the backscattered energy in terrestrial laser scanning data," Int. Arch. Photogramm. Remote Sens., vol. 37, pp. 1045-1052, 2008.
S. Khan, D. Wollherr, and M. Buss, "Modeling laser intensities for simultaneous localization and mapping," IEEE Robotics and Automation Letters, vol. 1, No. 2, pp. 692-699, 2016.
J. Levinson and S. Thrun, "Unsupervised calibration for multi-beam lasers," in International Symposium on Experimental Robotics (ISER), 2010.
J. Castorena, U. Kamilov, and P.T. Boufounos, "Autocalibration of lidar and optical cameras via edge alignment," in IEEE International Conference on Acoustics, Speech and Signal processing (ICASSP), Shanghai, Mar. 20-25, 2016, pp. 2862-2866.
A.V. Segal, D. Haehnel, and S. Thrun, "Generalized-icp," Robotics: Science and Systems, 2009.
M. Kaess, A. Ranganathan, and F. Dellaert, "isam: Incremental smooth-ing and mapping," IEEE Transactions on Robotics, vol. 24, No. 6, pp. 1365-1378, 2008.
R. Wolcott, D. Wollherr, and M. Buss, "Robust lidar localization using multiresolution gaussian mixture maps for autonomous driving," The International Journal of Robotics Research, vol. 36, No. 3, pp. 292-319, 2017.
C. Studholme, D.L. Hill, and D.J. Hawkes, "An overlap invariant entropy measure of 3d medical image alignment," Pattern Recognition, vol. 32, No. 1, pp. 71-86, Jan. 1999.
A. Dame and E. Marchand, "Mutual information-based visual servoing," IEEE Transactions on Robotics, vol. 5, No. 27, pp. 958-969, 2011.
E. Olson, "Real-time correlative scan matching," in in the Proc. IEEE International Conference in Robotics and Automation, Kobe, Japan, Jun. 2009.
G. Pandey, J. R. McBride, and R. M. Eustice, "Ford campus vision and lidar data set," IJRR International Journal of Robotics Research, 2011.
B. Höfle and N. Pfeifer, "Correction of laser scanning intensity data: Data and model-driven approaches," ISPRS Journal of Photogrammetry & Remote Sensing 62 (2007) 415-433.
R. Wolcott and R. Eustice, "Fast LIDAR Localization Using Multiresolution Gaussian Mixture Maps."
Y. Shao, C. Toth and D. Grejner-Brzezinska, "High-Accuracy Vehicle Localization Using a Pre-Built Probability Map," IGTF 2017—Imaging & Geospatial Technology Forum 2017 ASPRS Annual Conference Baltimore, Maryland w Mar. 11-17, 2017.
M. Kaess, H. Johannsson, R. Roberts, V. Ila, J. Leonard, and F. Dellaert, "iSAM2: Incremental Smoothing and Mapping Using the Bayes Tree," Draft manuscript, Apr. 6, 2011. Submitted to IJRR.
B. Steder, M. Ruhnke, R. Kummerle and W. Burgard, "Maximum Likelihood Remission Calibration for Groups of Heterogeneous Laser Scanners," this work has been partly supported by the EC under the grant Nos. ERC-AG-PE7-267686-LifeNav, FP7-610603-EUROPA2, and H2020-645403-RobDREAM.
T. Bailey and H. Durrant-Whyte, "Simultaneous Localisation and Mapping (SLAM): Part II State of the Art."

* cited by examiner

LIDAR LOCALIZATION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's location. Therefore, it is important that vehicle sensors provide the most accurate data possible concerning the vehicle's location. For example, safe and comfortable operation of the vehicle would be enhanced by addressing the problem of acquiring accurate and timely information regarding the location of the vehicle with respect to a map and therefore with respect to roadways and objects while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

Figure 1:
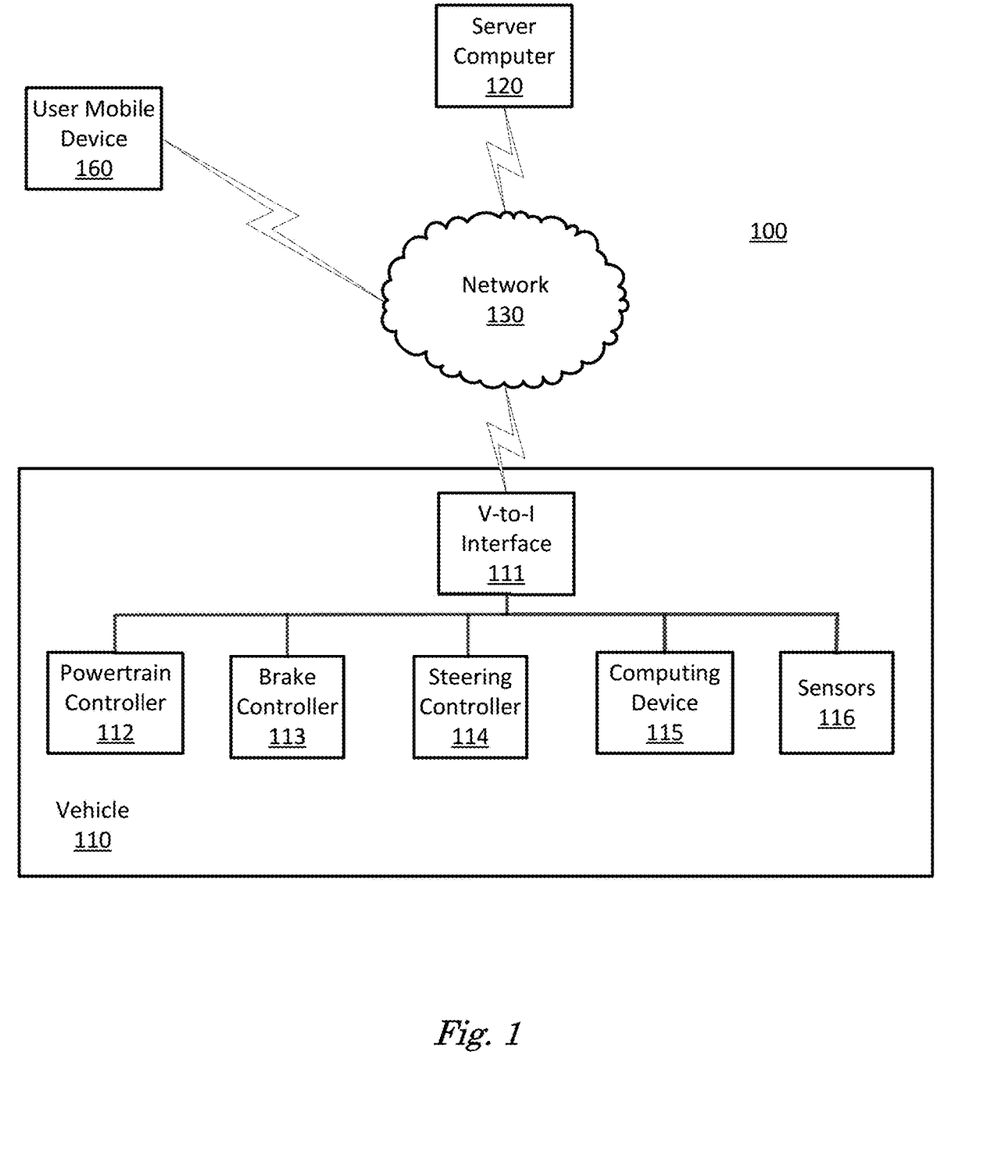
FIG. 1 is a block diagram of an example vehicle.
Figure 2:
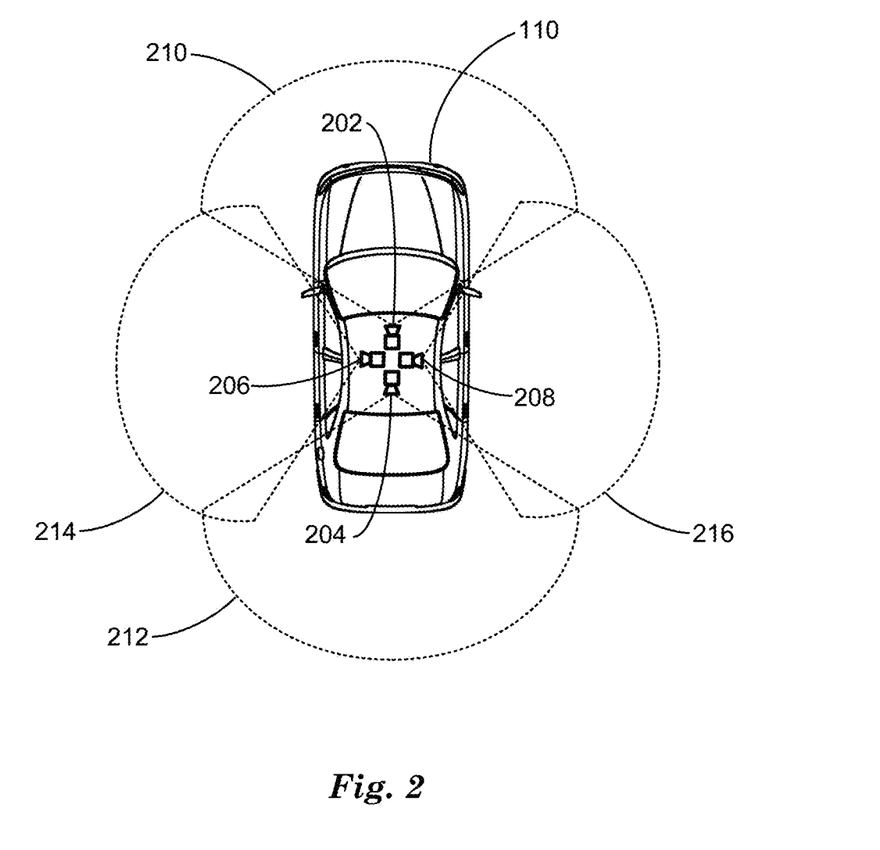
FIG. 2 is a diagram of an example vehicle including LIDAR sensors.

An estimate of the location of a vehicle with respect to a map can be used by a computing device to operate a vehicle on a roadway from a current location to a determined destination, for example. The computing device can input data from sensors including global positioning systems (GPS), inertial navigation systems (INS) and odometry to determine an estimate of positional data including the location of a vehicle with respect to a map. Referring to FIGS. 1 and 2, in the context of this disclosure odometry means determining vehicle 110 location based on odometer and compass heading data recorded by computing device 115 from sensors 116. Data from LIDAR sensors can be used to improve the accuracy of the estimate of a location of the vehicle with respect to a map by determining the location of objects included in the map. For example, ground-plane, edge data from an uncalibrated LIDAR sensor can be used to improve the accuracy of the estimate of vehicle location with respect to a map and thereby improve the operation of the vehicle by the computing device.

Disclosed herein is a method, comprising determining map data, determining uncalibrated LIDAR data, determining a location of a vehicle in the map data by combining the map data with the uncalibrated LIDAR data, and operating the vehicle based on the location of the vehicle in the map data. Determining the map data can include determining a first location with respect to the map data based on location sensors including GPS, INS, and odometry. Determining the uncalibrated LIDAR data can include determining reflectivity measurements corresponding to ground-plane return data and excluding measurements data corresponding to non-ground return data. Determining the uncalibrated LIDAR data can include orthogonally projecting reflectivity measurements onto a 2D grid. Determining the uncalibrated LIDAR data can include determining x and y gradients of the uncalibrated LIDAR data. Determining the uncalibrated LIDAR data can include combining x and y gradients of the uncalibrated LIDAR data from a plurality of LIDAR scans based on the location of the LIDAR scans. The uncalibrated LIDAR data can include missing data encoded as infinity. The 2D grid can be sampled at 10 cm in x and y.

Combining the map data with the uncalibrated LIDAR data can include matching the map data with the uncalibrated LIDAR data to determine registration between the map data and the uncalibrated LIDAR data by determining normalized mutual information over a set of neighborhood location/poses between the map data and the uncalibrated LIDAR data. Determining the location of the vehicle with respect to the map data can include updating the location by processing the registration between the map data and uncalibrated LIDAR data with an extended Kalman filter. Determining registration between the map data and the uncalibrated LIDAR data by determining normalized mutual information over a set of neighborhood location/poses by determining a maximum match between the map data and the uncalibrated LIDAR data. The normalized mutual information can be calculated as an entropy and joint entropy between the map data and the uncalibrated LIDAR data. Determining the map data can include forming a local portion of map data based on location data and a geographic region based on uncalibrated LIDAR data, wherein the geographic region is a 2D grid sampled at 10 cm in x and y.

Further disclosed is a computer readable medium, storing program instructions for executing some or all of the above method steps. Further disclosed is a computer programmed for executing some or all of the above method steps, including a computer apparatus, programmed to determine map data, determine uncalibrated LIDAR data, determine a location of a vehicle in the map data by combining the map data with the uncalibrated LIDAR data, and operating the vehicle based on the location of the vehicle in the map data. Determine the map data can include determine a first location with respect to the map data based on location sensors including GPS, INS, and odometry. Determine the uncalibrated LIDAR data can include determine reflectivity measurements corresponding to ground-plane return data and excluding measurements data corresponding to non-ground return data. Determine the uncalibrated LIDAR data can include orthogonally projecting reflectivity measurements onto a 2D grid. Determine the uncalibrated LIDAR data can include determine x and y gradients of the uncalibrated LIDAR data. Determine the uncalibrated LIDAR data can include combining x and y gradients of the uncalibrated LIDAR data from a plurality of LIDAR scans based on the location of the LIDAR scans. The uncalibrated LIDAR data can include missing data encoded as infinity (∞), for example. Other encodings, including not-a-number (NAN), can identify the missing data as not being valid, and therefore not eligible for further processing. The 2D grid can be sampled at 10 cm in x and y.

The computer can be further programmed to combine the map data with the uncalibrated LIDAR data can include matching the map data with the uncalibrated LIDAR data to determine registration between the map data and the uncalibrated LIDAR data by determining normalized mutual information over a set of neighborhood location/poses between the map data and the uncalibrated LIDAR data. The computer can be further programmed to determine the location of the vehicle with respect to the map data by updating the location by processing the registration between the map data and uncalibrated LIDAR data with an extended Kalman filter. The computer can be further programmed to determine registration between the map data and the uncalibrated LIDAR data by determining normalized mutual information over a set of neighborhood location/poses by determining a maximum match between the map data and the uncalibrated LIDAR data. The normalized mutual information can be calculated as an entropy and joint entropy between the map data and the uncalibrated LIDAR data. Determining the map data can include forming a local portion of map data based on location data and a geographic region based on uncalibrated LIDAR data, wherein the geographic region is a 2D grid sampled at 10 cm in x and y.

FIG. 1 is a diagram of a vehicle system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for executing stored instructions for actuating vehicle 110 components (e.g., brakes, steering, and/or propulsion), e.g., for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include conventional electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar sensor 116 (not shown) fixed in and/or to a front bumper of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

FIG. 2 is a diagram of an example vehicle including LIDAR sensors 202, 204, 206, 208. LIDAR sensors 202, 204, 206, 208 emit pulses of light, which can be infrared (IR). LIDAR sensors 202, 204, 206, 208 can receive IR pulses reflected by the environment and, based on received IR pulse intensity, determine an elapsed IR pulse time from the time of IR pulse emission. A distance or range from a LIDAR sensor 202, 204, 206, 208 to a reflecting surface in the environment can be determined from the elapsed IR pulse time by dividing the elapsed IR pulse time by twice the speed of light c. Computation of distance based on the elapsed IR pulse time can be based on the intensity of a received IR signal, where the intensity of the received IR pulse per unit time in W/s has to be greater than a predetermined threshold to indicate a returned pulse and thereby permit computation of the distance based on elapsed IR pulse time, for example.

LIDAR sensors 202, 204, 206, 208 can include an IR laser to form the emitted pulses. IR lasers can be readily focused down to a collimated beam having very low dispersion and can therefore project an IR pulse with a small (<1 cm) spot size and detect reflected pulses from surfaces at distances from about 10 cm to more than 40 meters. LIDAR sensors 202, 204, 206, 208 can each include an IR laser that can be scanned with various electromechanical or solid-state scanners including mirror galvanometers, prisms and birefringent crystals so as distribute the IR laser pulses in space to form fields of view 210, 212, 214, 216. Viewed from the top as in FIG. 2, a field of view 210, 212, 214, 216 can be a fan-shaped field indicating limits of useful data acquisition. Viewed from the side, a field of view 210, 212, 214, 216 expands the fan-shaped field up and down from a plane parallel to a ground plane to include a wedge-shaped 3D volume indicating limits of useful data acquisition. A laser beam can be steered within this 3D volume and sampled at appropriate rates to return data regarding the range or distance to objects within the 3D volume of field of view 210, 212, 214, 216.

The displacement from side-to-side and up-and-down of a laser beam within the 3D volume of a field of view 210, 212, 214, 216 can be measured about a central optical axis associated with each of the LIDAR sensors 202, 204, 206, 208. The angle of this central optical axis of the LIDAR sensor 202, 204, 206, 208 with respect to a coordinate system centered on a vehicle 110 can be used to combine LIDAR data output from LIDAR sensors 202, 204, 206, 208. Side-looking LIDAR sensors 206, 208 can be canted or tilted to scan a field of view at an angle to a ground plane. Side-view LIDAR sensors 206, 208 can be canted to provide fields of view 214, 216 that can return data for objects and surfaces closer to vehicle 110 by tilting the side-view LIDAR sensors 206, 208 and thereby the fields of view 214, 216 down towards the ground on each side of vehicle 110.

Figure 3:
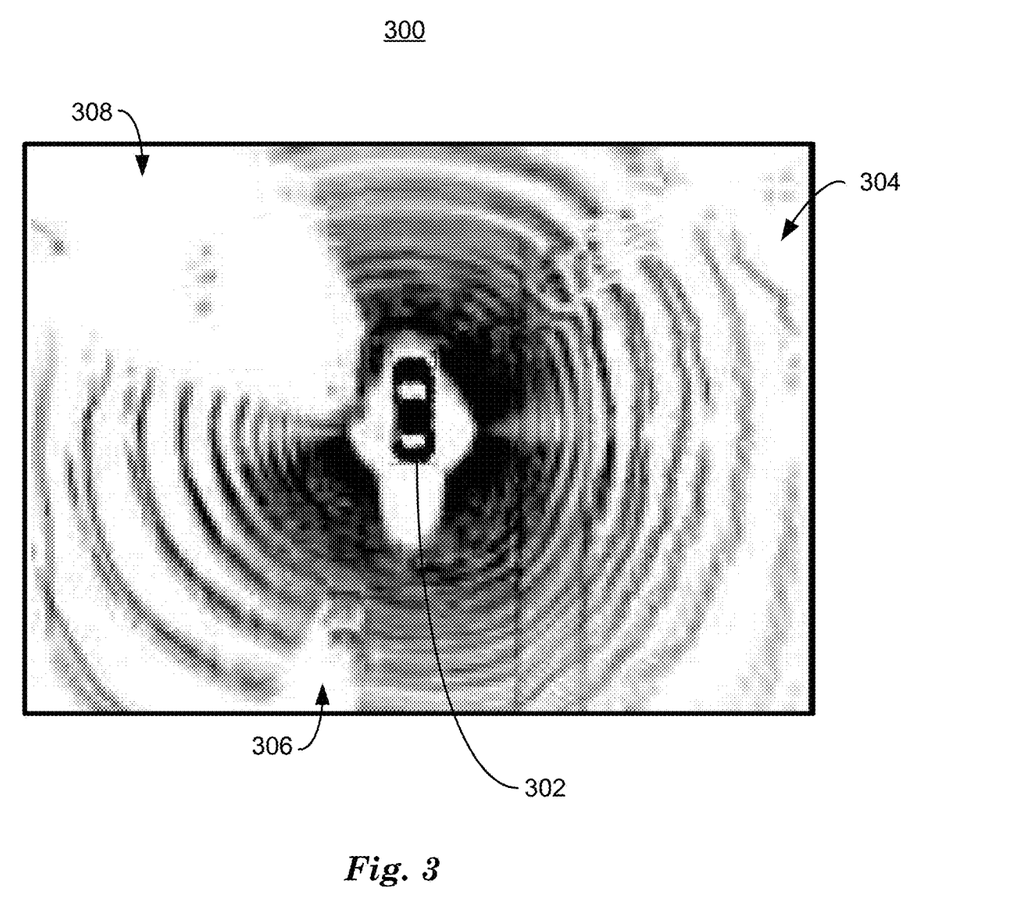
FIG. 3 is a diagram of example vehicle LIDAR intensity image from vehicle LIDAR sensors.

FIG. 3 is a diagram of example LIDAR intensity image [$x^\Phi$] 300 from vehicle LIDAR sensors 202, 204, 206, 208. LIDAR intensity image [$x^\Phi$] 300 includes an icon 302 representing a vehicle 110 and LIDAR data points 304 [$x^\Phi$]$_n$, where n represents the $n^{th}$ cell of the 2D grid or image, where a 2D grid is an array of points formed by the intersections of two sets of evenly-spaced lines, 10 cm apart, parallel to perpendicular x and y axes in a plane, for example. The points represent locations of LIDAR data points [$x^\Phi$]$_n$ 304, sampled at 10 cm intervals. A 3D grid adds a third dimension, z, perpendicular to the x, y plane. Each occurrence of LIDAR data points [$x^\Phi$]$_n$ 304 in LIDAR intensity image [$x^\Phi$] 300 represents combined reflectivity measurements $\tilde{y}^\Phi$ from pulse energy returned from the environment around vehicle 110 at the range indicated by its position in LIDAR intensity data 300 and is formed by orthographically projecting reflectivity measurements $\tilde{y}^\Phi$ from multiple LIDAR sensors 202, 204, 206, 208 onto an 2D grid in an X, Y plane parallel with a roadway or ground plane supporting vehicle 110 centered on a region around a vehicle 110, sampled at 10 cm intervals in X and Y, for example. The reflectivity measurements $\tilde{y}_n^\Phi$, where $\phi \in \Phi$, the set of all reflectivity measurements and n is the cell in the 2D grid into which the reflectivity measurements $\tilde{y}^\Phi$ are combined according to the equation:

$$[x^\phi]_n = \begin{cases} \dfrac{1}{M_n^\phi} \sum_{m=1}^{M_n^\phi} [\tilde{y}^\phi]_n & \text{for } n \in \Omega^\phi \\ \infty & \text{for } n \notin \Omega^\phi \end{cases} \quad (1)$$

where $[x^\phi]_n$ is the $n^{th}$ cell of 2D grid or image of LIDAR data points $[x^\phi]_n$ 304, $M_n^\phi$ is the set of reflectivity measurements $\tilde{y}_n^\phi$, and the $\Omega^\phi$ are the 2D grid domains of $\phi \in \Phi$, the set of all reflectivity measurements. Note that missing reflectance data can be encoded as $\infty$ or NAN, and cells of the LIDAR intensity image $[x^\phi]$ 300 that include the value $\infty$ or NAN do not participate in any further processing.

LIDAR intensity image $[x^\phi]$ 300 can be processed to eliminate LIDAR data points $[x^\phi]_n$ 304 not within a predetermined tolerance, for example 10 cm to 50 cm, of a ground plane relative to vehicle 110. Since a ground plane is determined relative to vehicle 110, the ground plane, and therefore the LIDAR intensity image $[x^\phi]$ 300 2D grid, will be parallel with the surface of a roadway or other surface that supports a vehicle 110, such as ramps, bridges, and parking spaces, for example. The variation in pose, where pose means the angle in space of a plane with respect to 3D world coordinates, between LIDAR intensity image $[x^\phi]$ 300 2D grids are ignored when combining multiple LIDAR intensity image $[x^\phi]$ 300 2D grids. Based on LIDAR intensity image $[x^\phi]$ 300 including information regarding range in 3D, computing device 115 can prune or discard any LIDAR data points $[x^\phi]_n$ 304 that do not originate at, or within a predetermined tolerance of, a ground plane. Also, visible in LIDAR data points $[x^\phi]_n$ 304 are blank areas 306, 308 caused by other vehicles near vehicle 110 returning LIDAR data points $[x^\phi]_n$ 304 that are outside of the predetermined tolerance of the 3D location of a ground plane. Combining reflectivity measurements $\tilde{y}_n^\phi$ from multiple LIDAR images acquired at multiple times to create one set of LIDAR intensity image $[x^\phi]$ 300 can improve LIDAR intensity image $[x^\phi]$ 300 by providing multiple reflectivity measurements $\tilde{y}_n^\phi$ for each point in LIDAR intensity image $[x^\phi]$ 300, and thereby improve the accuracy of LIDAR intensity image $[x^\phi]$ 300 including filling in blank areas 306, 308.

Figure 4:
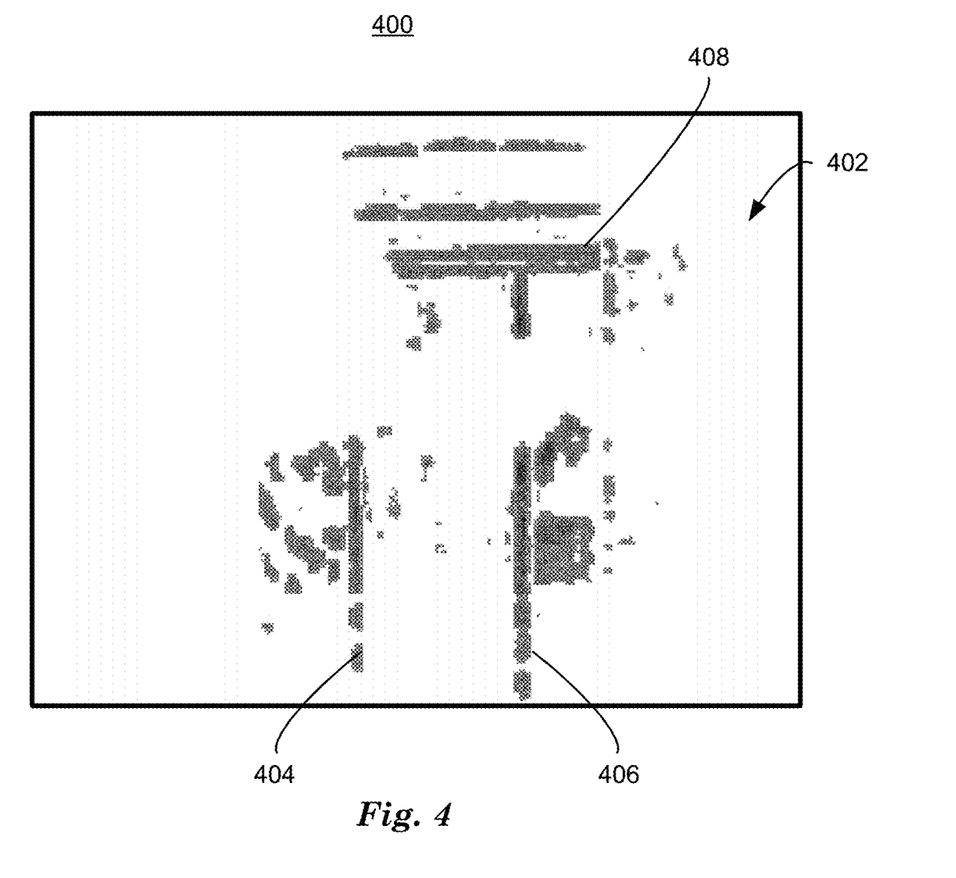
FIG. 4 is a diagram of example LIDAR gradient image from vehicle LIDAR data.

FIG. 4 is a diagram of example LIDAR edge data 400 from vehicle LIDAR intensity data 300. As discussed above in relation to FIG. 3, LIDAR intensity data 300 is processed by computing device 115 to prune LIDAR data points 304 that do not correspond to a ground plane. The pruned LIDAR data points 304 are processed with a gradient operator in both X and Y to form two gradient images $[D_x x]$, $[D_y x]$, according to the equation:

$$[Dx]_n = \begin{pmatrix} [D_x x]_n \\ [D_y x]_n \end{pmatrix} = \begin{pmatrix} [x]_{n+N_y} - [x]_n \\ [x]_{n+1} - [x]_n \end{pmatrix} \quad (2)$$

where the gradient images $[Dx]_n$, are gradients calculated in x and y (horizontal and vertical) directions with respect to 2D grid $[x]$.

LIDAR gradient image $[Dx]$ 400 includes LIDAR edge data $[Dx]_n$ 402, where n indicates the $n^{th}$ cell of 2D grid of LIDAR gradient image $[Dx]$ 400. LIDAR edge data $[Dx]_n$ 402 includes features, which are defined as repeatedly occurring 2D patterns recognizable by machine vision programs, including roadway lane markings 404, 406, 408, for example. Features detectable in this fashion include lane markings 404, 406, 408, roadway edges and curbs, driveways, and entrance and exit ramps and intersections, etc. LIDAR edge data $[Dx]_n$ 402 is pruned and gradient-detected in this fashion to permit the LIDAR edge data $[Dx]_n$ 402 to be efficiently matched to map data, since data points corresponding to the data points remaining in pruned and gradient-detected LIDAR edge data $[Dx]_n$ 402 are likely to be found in map data. Conversely, raw, unprocessed LIDAR intensity data $[x^\phi]$ 300 can include LIDAR data points 304 corresponding to other vehicles and structures that are not likely rendered in map data, and would therefore decrease the probability of forming a match between LIDAR intensity data $[x^\phi]$ 300 and map data. Matching pruned and gradient-detected LIDAR edge data $[Dx]_n$ 402 to map data can be faster and more accurate than matching raw LIDAR intensity data 300 to map data.

Figure 5:
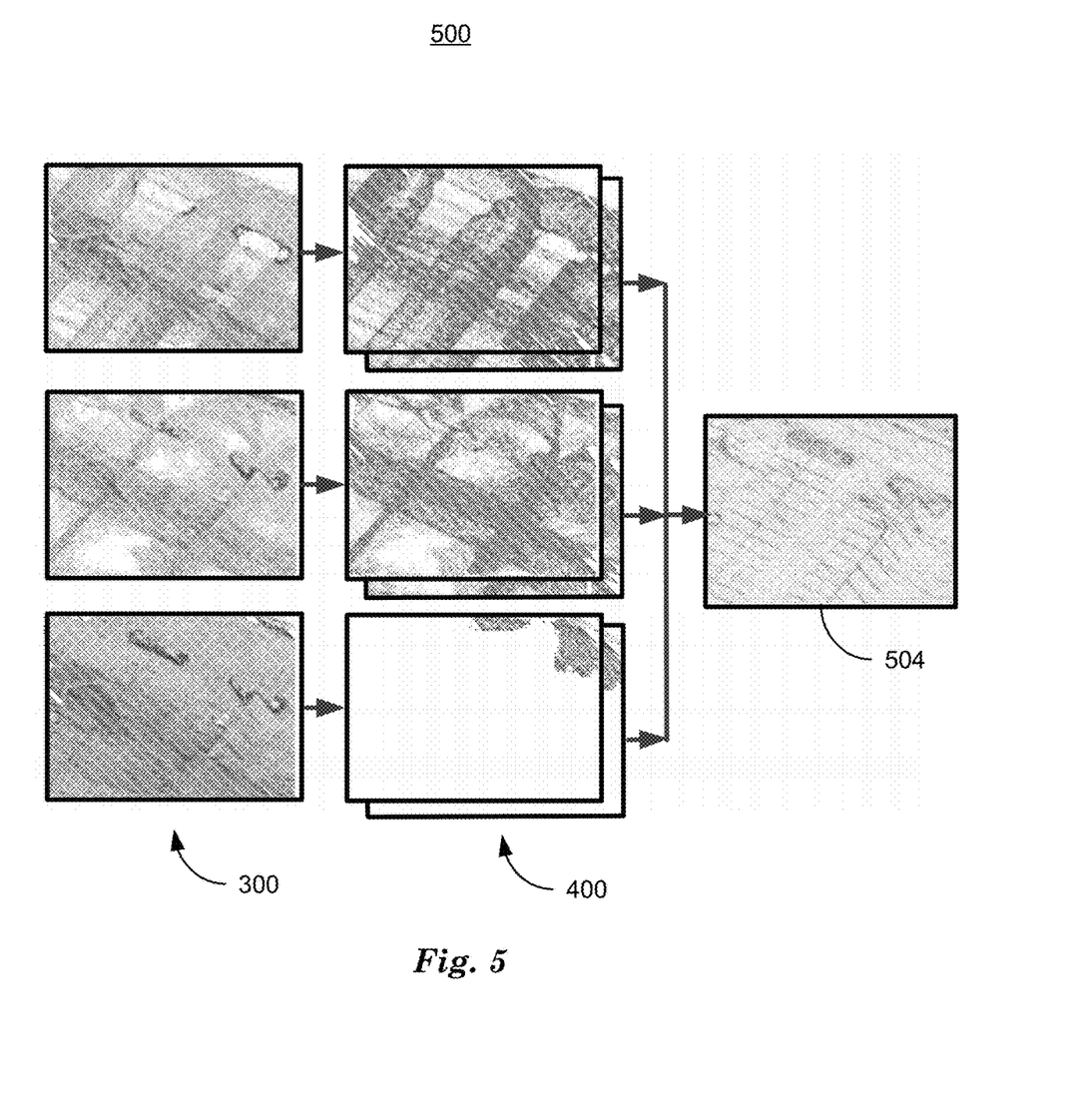
FIG. 5 is a diagram of example LIDAR gradient images combined to form an output LIDAR edge image.

FIG. 5 is a diagram of example LIDAR gradient images $[Dx^\phi]$ 400 combined to form a fused gradient magnitude LIDAR gradient image $[\hat{D}x]$ 504. First, LIDAR intensity images $[x^\phi]$ 300 are formed from reflectivity measurements $\tilde{y}^\phi$ according to equation 1, above. Each LIDAR intensity image $[x^\phi]$ 300 is pruned to include only ground-plane data as discussed above in relation to FIG. 3. Then, LIDAR intensity images $[x^\phi]$ 300 are transformed into LIDAR gradient images $[Dx^\phi]$ 400 by processing according to equation 2, as discussed in relation to FIG. 4. Note that each LIDAR gradient image $[Dx^\phi]$ 400 includes two gradient images $([D_x x]_n, [D_y x]_n)$. The LIDAR gradient images $[Dx^\phi]$ 400 are combined to form a fused gradient magnitude LIDAR edge image $[\hat{D}x]$ 504 according to the equation:

$$[\hat{D}x] = \dfrac{1}{|\Phi|} \Sigma_{\phi \in \Phi} [Dx^\phi] \quad (3)$$

where the LIDAR gradient images $[Dx^\phi]$ 400 are summed over all $\phi \in \Phi$, the set of reflectivity measurements $\tilde{y}^\phi$.

Figure 6:
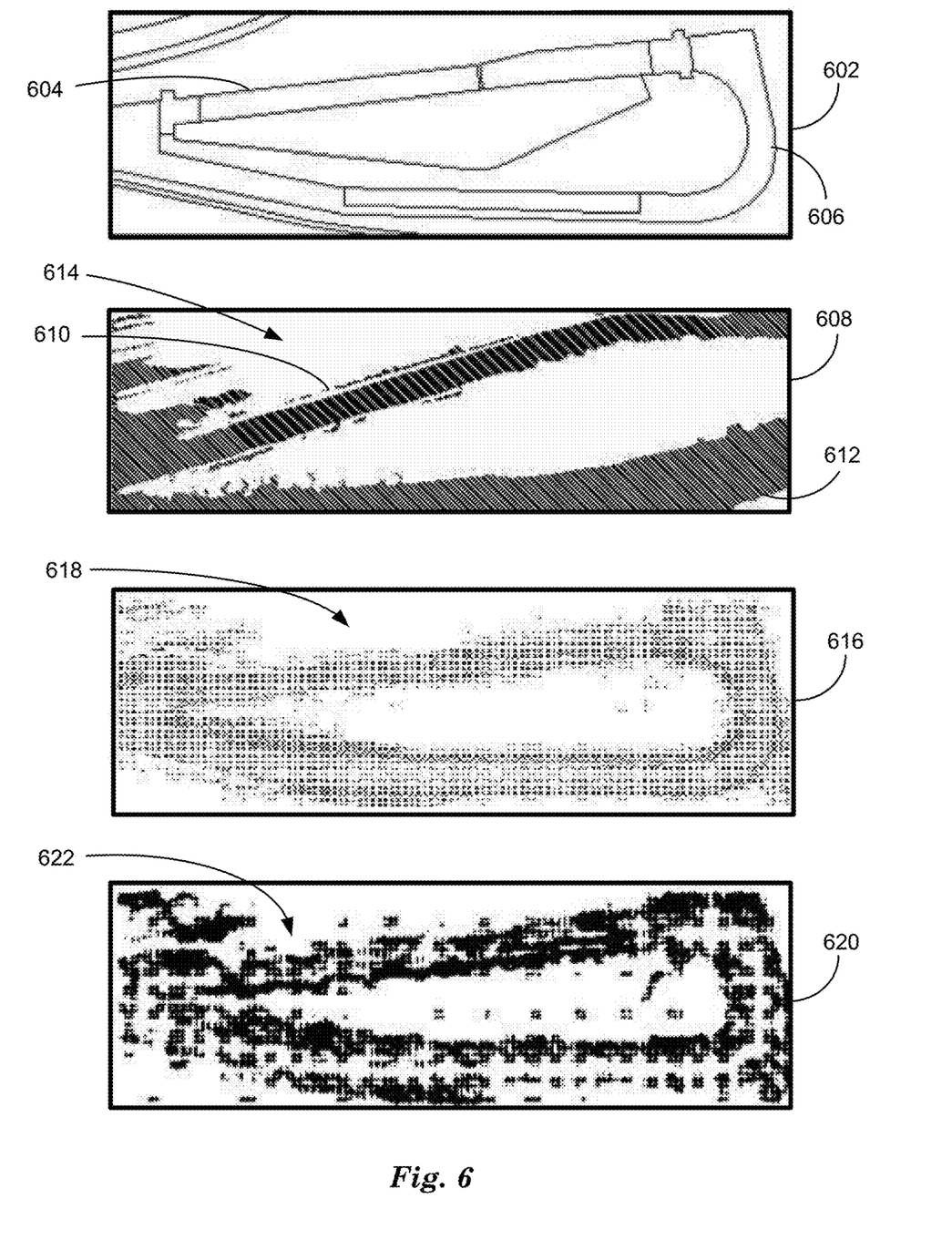
FIG. 6 is a diagram of example map data, LIDAR range data, LIDAR intensity data, and LIDAR gradient data.

FIG. 6 is a diagram of example map data 602, LIDAR range image 608, LIDAR intensity image 614, and LIDAR gradient image 620. Map data 602 can be rendered as a color, greyscale or line drawing. Map data 602 can be pre-loaded in computing device 115 memory or downloaded from a server computer 120 via V-to-I interface 111. Map data 602 is collection of map data points from a source such as GOOGLE™ maps, for example, that are included in a 2D representation of a determined geographic region, where a geographic region is a collection of contiguous locations on the earth's surface denoted by latitude, longitude. The geographic region can be determined by making the geographic region rectangular and including all locations included in a planned vehicle 110 route, for example. Map data points can include map data points from satellite image data, airborne LIDAR, and geophysical data associated with a determined geographic region, for example. Map data 602 can be processed by machine vision programs, for example, to identify features of interest present in GOOGLE™ maps, including roadways 606 and bridges 604. Other features of interest that can be identified in GOOGLE™ maps, include lane markings, roadway edges and curbs, driveways, and entrance and exit ramps, and intersections etc. These features of interest will generate data points in map data 602 that can be matched to data points in LIDAR gradient image 620.

LIDAR range image 608 can be formed by orthographically projecting acquired LIDAR range data points 614 into LIDAR range data 608 based on the fields of view 210, 212, 214, 216 associated with LIDARs 202, 204, 206, 208 and the location and pose of the vehicle 110 when the LIDAR range data points 614 were acquired. LIDAR range image 608 is a 2D grid including LIDAR data points 614 that represent an altitude of LIDAR range data points 614 above or below a ground plane. Computing device 115 can determine the location and pose fields of view 210, 212, 214, 216 based on location sensors 116 included in vehicle 110 including GPS, INS, and odometery, and based on the location and pose, computing device 115 can orthographically project reflectivity measurements $\tilde{y}^\Phi$ from multiple LIDAR scans taken at multiple locations onto LIDAR range image 608 to form an elevation map. LIDAR range image 608 can further be formed by combining LIDAR range data points 614 from multiple acquired LIDAR scans as vehicle 110 is operated on a roadway 612 or bridge 610. Location information from location sensors 116, including GPS, INS, and odometery, can locate vehicle 110 with relatively coarse accuracy (8.5-11 m, as discussed below) with respect to map data 602, but very good relative accuracy (10 cm accuracy) among LIDAR range data points 614, and therefore permit combining reflectivity measurements $\tilde{y}^\Phi$ from multiple LIDAR scans into a LIDAR range image 608 having 10 cm relative accuracy. Relative accuracy means that while the location accuracy of LIDAR range data points 614 with respect to world coordinates can be unknown, the locations of LIDAR range data points 614 with respect to each other in LIDAR range image 608 are repeatably measurable to within 10 cm.

Reflectivity measurements $\tilde{y}^\Phi$ from scans by a LIDAR sensor 202, 204, 206, 208 can be calibrated or uncalibrated. Calibration is a process by which a LIDAR sensor 202, 204, 206, 208 on a vehicle 110 scan an object placed at a predetermined location within the field of view 210, 212, 214, 216. A LIDAR image is acquired and the reflectivity measurements $\tilde{y}^\Phi$ in the LIDAR scans corresponding to the object are compared to the predetermined location associated with the object. By comparing acquired reflectivity measurements $\tilde{y}^\Phi$ of objects at predetermined distance and angles with respect to LIDAR sensors 202, 204, 206, 208 included in vehicle 110, a linear transformation between real world location coordinates determined by computing device 115 using location sensors 116, and reflectivity measurements $\tilde{y}^\Phi$ can be determined that can transform reflectivity measurements $\tilde{y}^\Phi$ and vehicle location and pose information into real world map data 602 coordinates with good accuracy with respect to the location of vehicle 110. The linear transformation can be used to transform acquired reflectivity measurements $\tilde{y}^\Phi$ to real world coordinates with good accuracy. Good accuracy can be defined as correctly matching transformed reflectivity measurements $\tilde{y}^\Phi$ with corresponding data points in map data 602 within 10 cm or less.

Calibrated LIDAR sensors 202, 204, 206, 208 can permit LIDAR range data points 608 to be used to locate a vehicle in map data 602 with good accuracy, however, calibration can be costly and time-consuming, and can require expert human involvement and expensive additional equipment. Calibration typically is checked and repeated periodically to ensure that the LIDAR sensors 202, 204, 206, 208 remain calibrated. For example, GPS data can be acquired with a resolution of 1/1000 per minute of latitude and longitude. At 40° of latitude, a minute of latitude is about 111 km and a minute of longitude is about 85 km. Taking 1/1000 of these values yields a resolution of 11 m and 8.5 m respectively. A resolution of 8.5 to 11 m is not adequate to locate a vehicle 110 on a roadway with sufficient accuracy to operate the vehicle 110 to reliably and safely reach a destination, for example. Determining the location of vehicle 110 with respect to map data 602 can be improved by correlating LIDAR range data 614 with the map data 602. Since computing device 115 stores very accurate data including the location and pose of vehicle 110 with respect to LIDAR range data 614, computing device 115 can determine a location of a vehicle 110 with respect to map data 602 by determining a maximum correlation between LIDAR range data 614 and map data 602. This technique requires calibrated LIDAR sensors 202, 204, 206, 208 producing calibrated LIDAR range data 614.

Uncalibrated LIDAR sensors 202, 204, 206, 208 can produce a LIDAR intensity image 616 having LIDAR data points 618 with location values having a relative accuracy of greater than 10 cm in x, y, and z dimensions, as discussed above, but do not locate vehicle 110 reliably within 10 cm with respect to real world coordinates. LIDAR gradient image 620 includes LIDAR gradient data points 622 based on ground-plane pruned and gradient-detected uncalibrated LIDAR intensity data points 618 as discussed above in relation to FIGS. 3-5. LIDAR gradient data points 622 can be combined with map data 602 points using a matching algorithm to locate vehicle 110 to within 10 cm accuracy based on techniques described below in relation to FIGS. 7 and 8.

Figure 7:
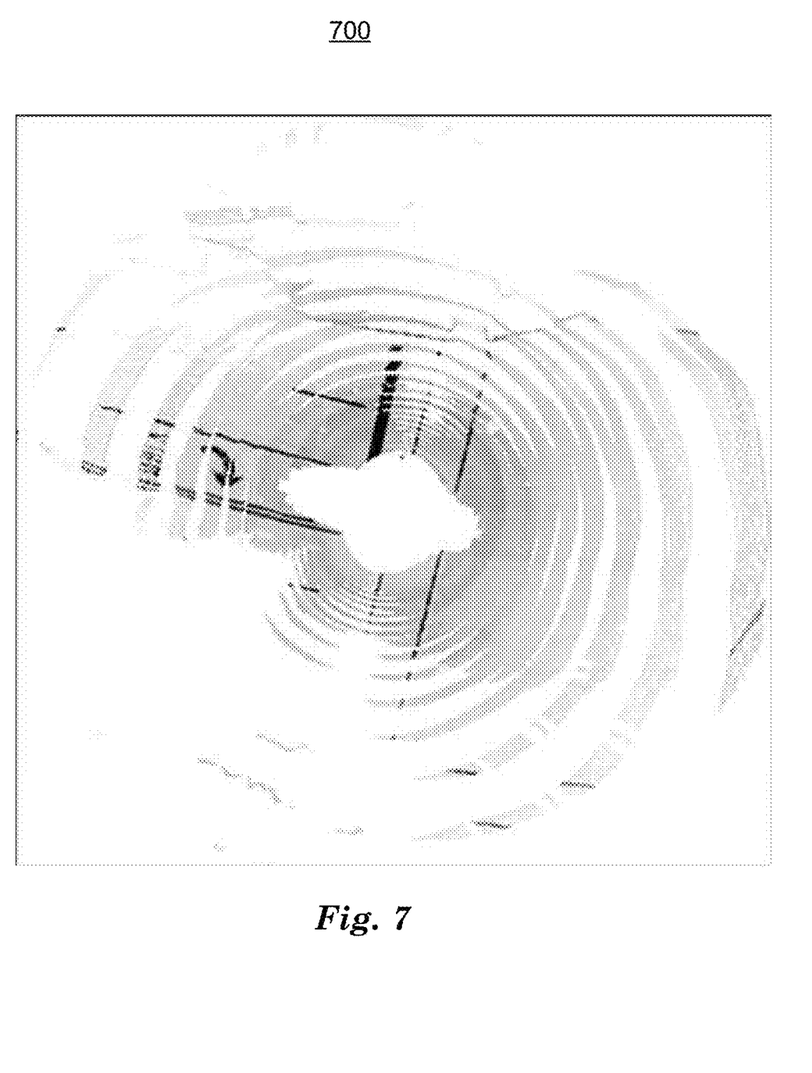
FIG. 7 is a diagram of an example local reflectivity map.

FIG. 7 is a diagram of an example local reflectivity map 700. Local reflectivity map 700 is an uncalibrated LIDAR intensity image $[x^\Phi]$ 300 from one or more uncalibrated LIDAR sensors 202, 204, 206, 208, processed by computing device 115 to prune reflectivity returns that do not originate from or near a ground plane to produce local reflectivity map 700 corresponding to a local geographic region around the location of vehicle 110, The local reflectivity map 700 can be processed as discussed above in relation to FIG. 4 to form a LIDAR gradient image $[\hat{D}x]$ 800 (FIG. 8).

Figure 8:
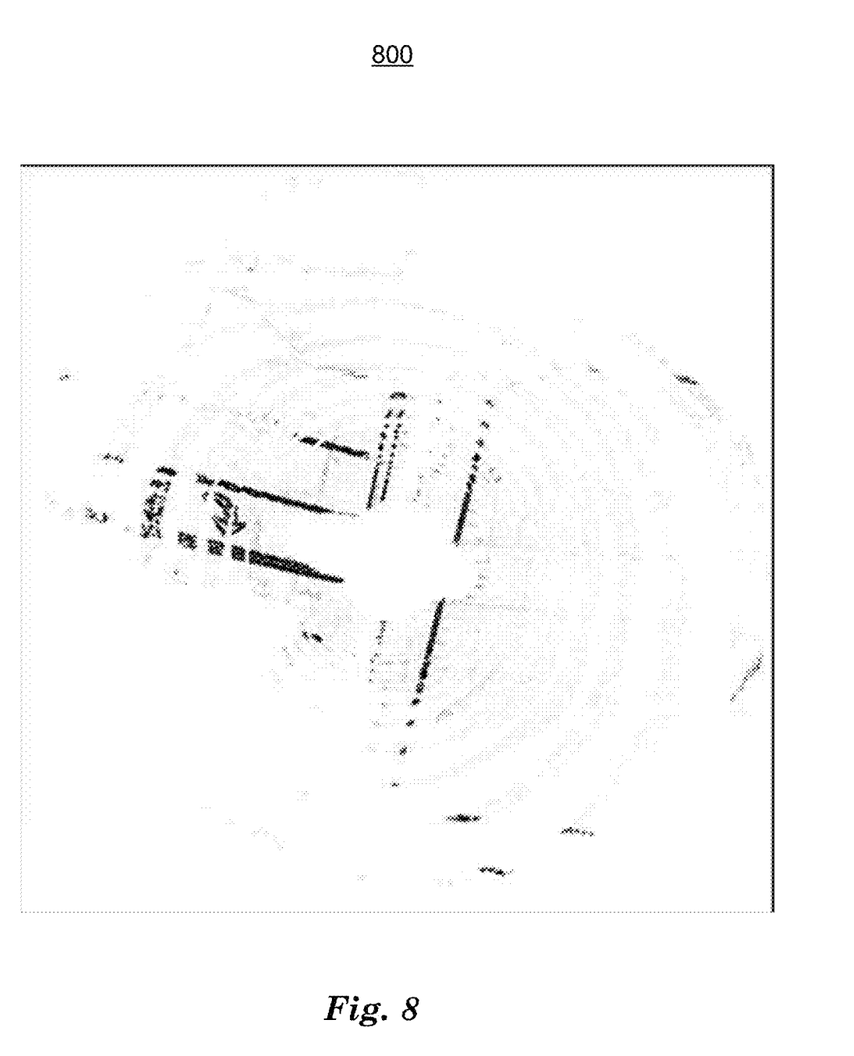
FIG. 8 is a diagram of an example LIDAR gradient image.

FIG. 8 is a diagram of an example LIDAR gradient image $[\hat{D}x]$ 800. The LIDAR gradient image $[\hat{D}x]$ 800 includes a 40 m×40 m square region centered on a vehicle 110, sampled with 10 cm resolution. LIDAR gradient image $[\hat{D}x]$ 800 is matched with a local portion of map data 602 corresponding to the local geographic region included in LIDAR gradient image $[\hat{D}x]$ 800 based on normalized mutual information (NMI) to provide estimated registration $\hat{\Theta}$ between $d_{G|\Omega_\theta}$=LIDAR gradient image $[\hat{D}x]$ 800 and $d_L$=local portion of map data 602 included in the local geographic region included in LIDAR gradient image $[\hat{D}x]$ 800 by the equation:

$$\hat{\Theta} = \arg\max_{\theta \in \Theta}\{NMI(d_L, d_{G|\Omega_\theta})\} \quad (4)$$

where $\Theta$ is a small pose neighbor set including a finite number of locations and poses distributed about a central location and pose, based on $\theta$, the location/pose elements of pose neighbor set $\Theta$ which translate and rotate $d_{G|\Omega_\theta}$ with respect to $d_L$. The arg $\max_{\theta \in \Theta}$ function performs an NMI registration search by stepping through location/pose neighbor set $\Theta$, at each step translating and rotating $d_{G|\Omega_\theta}$ with respect to $d_L$, calculating NMI registration, and selecting the location/pose that maximizes the match between $d_L$ and $d_{G|\Omega_\theta}$ according to the equation:

$$NMI(d_L, d_{G|\Omega_\theta}) = \frac{H(d_L) + H(d_{G|\Omega_\theta})}{H(d_L, d_{G|\Omega_\theta})} \quad (5)$$

where $H(d_L)$ and $H(d_{G|\Omega_\theta})$ are the entropy of random variables A and B, normalized by dividing the sum of $H(d_L)$ and $H(d_{G|\Omega_\theta})$ by $H(d_L, d_{G|\Omega_\theta})$, the joint entropy of random variables $d_L$ and $d_{G|\Omega_\theta}$. Entropy can be calculated as a measure of dispersion applied to random variables $d_L$ and $d_{G|\Omega_\theta}$ individually, and applied to combinations of random variables $d_L$ and $d_{G|\Omega_\theta}$. The measure of dispersion to be applied depends upon the underlying probability distributions of the random variables $d_L$ and $d_{G|\Omega_\theta}$ individually, and their combination. Probability distributions of random variables $d_L$ and $d_{G|\Omega_\theta}$ can be determined empirically and their combination thereafter determined mathematically.

Equation 4 returns an estimated registration $\hat{\Theta}$, which is the translation and rotation applied to LIDAR gradient image $[\hat{D}x]$ 800 that causes LIDAR gradient image $[Dx]$ 800 to most closely match local portion of map data 602. The estimated registration $\hat{\Theta}$ can be used to locate vehicle 110 with respect to map data 602 with greater than 10 cm accuracy by determining a plurality of estimated registrations, $\Theta_k$, $\{1 \le k \le N\}$, and performing fusion with location estimates based on location sensors 116 including GPS, INS and odometery, using an extended Kalman filter (EKF) to form predictions of estimated registration $\overline{\Theta}_k$ and estimated summation matrix $\Sigma_k$ according to equations:

$$\overline{\Theta}_k = F_{k-1}\Theta_{k-1} \quad (6)$$

$$\Sigma_k = F_{k-1}\Sigma_{k-1}F_{k-1}^T + Q_{k-1} \quad (7)$$

where filter $F_k$ is a vector that weights the contributions of previous estimates $\Theta_k$ based on temporal displacement. $\overline{\Theta}_k$ and $\Sigma_k$ can be updated by calculating a Kalman update factor $K_k$ according to the equation:

$$K_k = \Sigma_k H_k^T (H_k \Sigma_k H_k^T + R_k)^{-1} \quad (8)$$

where $H_k$ are vectors of weights and $R_k$ is the corresponding uncertainty estimated as a cost function based on NMI covariance from equation 5. Kalman update factor $K_k$ can be used to update $\overline{\Theta}_k$ and $\Sigma_k$ at a time step k according to the equations:

$$\Theta_k = \overline{\Theta}_k + K_k(z_k - h_k(\overline{\Theta}_k)) \quad (9)$$

$$\Sigma_k = (I - K_k H_k)\Sigma_k(I - K_k H_k)^T + K_k R_k K_k^T \quad (10)$$

where I is the identity matrix, $H_k$ and $R_k$ are as above, $h_k$ is a weighting function at time step k and $z_k = \hat{\Theta}_k$, the output from NMI registration in equation 4. Filter $F_k$ can be initialized with an estimated location based on location sensors 116 and updated based on $z_k$. The NMI registration stage associated with equations 4 and 5 is performed with a dynamic bound exhaustive search adaptively updated to a 3σ window about the posterior distribution of the EKF. This corresponds to a resolution of 20 cm in x and y dimensions. Determination of vehicle 110 location in map data 602 based on uncalibrated LIDAR data points 618 can improve resolution of vehicle 110 location information from 8.5 to 11 m to 20 cm or less.

Figure 9:
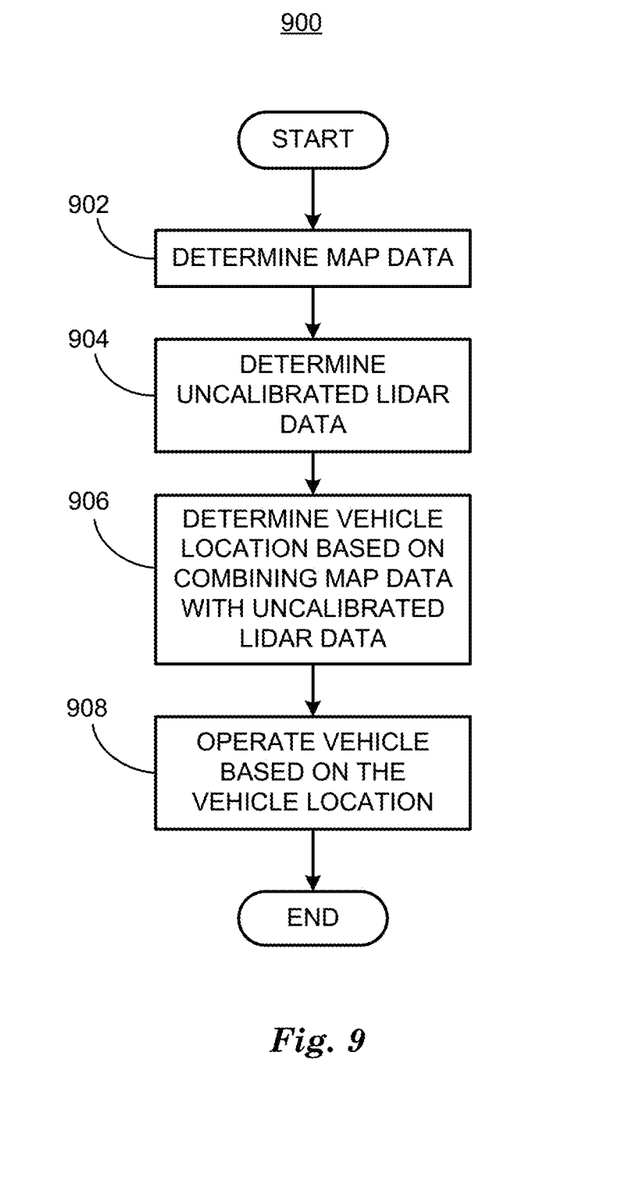
FIG. 9 is a flowchart diagram of an example process to operate a vehicle based on a location based on a LIDAR edge data.

FIG. 9 is a diagram of a flowchart, described in relation to FIGS. 1-8, of a process 900 for operating a vehicle based on determining a vehicle location. Process 900 can be implemented by a processor of computing device 115, taking as input information from sensors 116, and executing commands and sending control signals via controllers 112, 113, 114, for example. Process 900 includes multiple steps taken in the disclosed order. Process 900 also includes implementations including fewer steps or can include the steps taken in different orders.

Process 900 begins at step 902, where a computing device 115 determines a local portion of map data 602. Local portion of map data 602 is determined by computing device 115 by recalling stored map data 602 from memory or downloading map data 602 from a server computer 120, or both, as discussed in relation to FIG. 6, above. Determining local portion of map data 602 includes determining a first location estimate for vehicle 110 based on location sensors 116 including GPS, INS and odometery.

At step 904 computing device 115 determines uncalibrated LIDAR data including uncalibrated LIDAR data points $[x^\Phi]_n$ 304 based on uncalibrated LIDAR sensors 202, 204, 206, 208 as discussed above in relation to FIGS. 6-8, above. The uncalibrated LIDAR data points $[x^\Phi]_n$ 304 are pruned to include ground-plane data only, gradient-detected and combined to form an uncalibrated LIDAR gradient image $[Dx]$ 400.

At step 906 computing device 115 determines a vehicle 110 location with respect to map data 602 by combining local portion of map data 602 with uncalibrated LIDAR gradient image $[Dx]$ 400 as discussed above in relation to FIGS. 7 and 8, wherein map data 602 is transformed into a local portion of map data 602 based on the first location estimate. Computing device 115 then matches the local portion of map data 602 with uncalibrated LIDAR gradient image $[Dx]$ 400 over a set of neighboring poses to determine an estimated registration $\hat{\Theta}$, which can be input to an EKF to determine a location estimate for vehicle 110 with respect to map data 602.

At step 908, computing device 115 can operate vehicle 110 based on the location estimate determined at step 906. The location estimate can be determined with an accuracy of 20 cm, meaning that the reported location estimate of vehicle 110 with respect to map data 602 has a 99.73% probability, or 3σ, of being within 20 cm of the true location of vehicle 110 with respect to map data 602. 20 cm accuracy is sufficient accuracy to permit computing device 115 to operate vehicle 110 to a destination using map data 602 in a safe and comfortable manner. Following this step process 900 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

I claim:

1. A method, comprising:
   determining map data;
   determining uncalibrated LIDAR data by including reflectivity measurements corresponding to ground-plane return data and excluding measurements data corresponding to non-ground-plane return data;
   determining a location of a vehicle in the map data by combining the map data with the uncalibrated LIDAR data; and
   operating the vehicle based on the location of the vehicle in the map data.

2. The method of claim 1, wherein determining the map data includes determining a first location with respect to the map data based on location sensors including GPS, INS, and odometry.

3. The method of claim 1, further comprising determining the uncalibrated LIDAR data by orthogonally projecting reflectivity measurements onto a 2D grid.

4. The method of claim 3, further comprising determining the uncalibrated LIDAR data by determining x and y gradients of the uncalibrated LIDAR data.

5. The method of claim 4, further comprising determining the uncalibrated LIDAR data by combining x and y gradients of the uncalibrated LIDAR data from a plurality of LIDAR scans based on the location of the LIDAR scans.

6. The method of claim 5, wherein the uncalibrated LIDAR data includes missing data encoded as infinity or NAN.

7. The method of claim 1, wherein combining the map data with the uncalibrated LIDAR data includes matching the map data with the uncalibrated LIDAR data to determine registration between the map data with the uncalibrated LIDAR data by determining normalized mutual information over a set of neighborhood location/poses between the map data and the uncalibrated LIDAR data.

8. The method of claim 7, further comprising determining the location of the vehicle with respect to the map data by updating the location by processing the registration between the map data and uncalibrated LIDAR data with an extended Kalman filter.

9. A system, comprising a processor; and
   a memory, the memory including instructions to be executed by the processor to:
     determine map data;
     determine uncalibrated LIDAR data by including reflectivity measurements corresponding to ground-plane return data and excluding measurements data corresponding to non-ground-plane return data;
     determine a location of a vehicle in the map data by combining the map data with the uncalibrated LIDAR data; and
     operate the vehicle based on the location of the vehicle in the map data.

10. The processor of claim 9, further programmed to determine the map data including determining a first location with respect to the map data based on location sensors including GPS, INS, and odometry.

11. The processor of claim 9, further programmed to determine the uncalibrated LIDAR data by orthogonally projecting reflectivity measurements onto a 2D grid.

12. The processor of claim 11, further programmed to determine the uncalibrated LIDAR data by determining x and y gradients of the uncalibrated LIDAR data.

13. The processor of claim 12, further programmed to determine the uncalibrated LIDAR data by combining x and y gradients of the uncalibrated LIDAR data from a plurality of LIDAR scans based on the location of the LIDAR scans.

14. The processor of claim 13, wherein the uncalibrated LIDAR data includes missing data encoded as infinity or NAN.

15. The processor of claim 9, wherein combining the map data with the uncalibrated LIDAR data includes matching the map data with the uncalibrated LIDAR data to determine registration between the map data with the uncalibrated LIDAR data by determining normalized mutual information over a set of neighborhood location/poses between the map data and the uncalibrated LIDAR data.

16. The processor of claim 15, further programmed to determine the location of the vehicle with respect to the map data by updating the location by processing the registration between the map data and uncalibrated LIDAR data with an extended Kalman filter.

17. A system, comprising
   an uncalibrated LIDAR sensor operative to acquire uncalibrated LIDAR data;
   a location sensors operative to acquire a first location;
   vehicle components operative to operate a vehicle;
   a processor; and
   a memory, the memory including instructions to be executed by the processor to:
     determine map data based on the first location;
     determine uncalibrated LIDAR data by including reflectivity measurements corresponding to ground-plane return data and excluding measurements data corresponding to non-ground-plane return data;

determine a location of a vehicle in a second map by combining the map data with the uncalibrated LIDAR data; and actuate vehicle components to operate the vehicle based on the location of the vehicle in the second map.

18. The system of claim 17, wherein the first location is acquired by location sensors including GPS, INS, and odometry.

* * * * *